United States Patent
Lee et al.

(10) Patent No.: US 7,869,403 B2
(45) Date of Patent: Jan. 11, 2011

(54) SYSTEMS AND METHODS FOR ASSIGNING PHYSICAL RESOURCE BLOCKS

(75) Inventors: Suk-Bok Lee, Los Angeles, CA (US); Shugong Xu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 767 days.

(21) Appl. No.: 11/858,043

(22) Filed: Sep. 19, 2007

(65) Prior Publication Data

US 2009/0073926 A1    Mar. 19, 2009

(51) Int. Cl.
*H04W 4/00* (2009.01)
(52) U.S. Cl. ...................... 370/329; 370/208
(58) Field of Classification Search ............. 370/329, 370/208, 331
See application file for complete search history.

(56) References Cited

U.S. PATENT DOCUMENTS

| | | | | |
|---|---|---|---|---|
| 2006/0159004 | A1* | 7/2006 | Ji | 370/208 |
| 2007/0242636 | A1* | 10/2007 | Kashima et al. | 370/329 |
| 2008/0137608 | A1* | 6/2008 | Bu et al. | 370/331 |
| 2010/0202369 | A1* | 8/2010 | Pedersen et al. | 370/329 |

OTHER PUBLICATIONS

Christian Wengerter et al., "Fairness and Throughput Analysis for Generalized Proportional Fair Frequency Scheduling in OFDMA", IEEE Transaction Vehicular Technology Conference, vol. 3, May 2005, pp. 1903-1907.*
M. Andrews, "A Survey of Scheduling Theory in Wireless Data Networks," IMA, 2005.
M. Andrews, L. Zhang, "Scheduling Algorithms for Multi-Carrier Wireless Data Systems," ACM MobiCom, 2007.
A. Jalali, R. Padovani, R. Pankaj, "Data Throughput of CDMA-HDR a High Efficiency-High Data Rate Personal Communication Wireless System," IEEE Trans. Vehicular Technology Conference Proceedings, vol. 3, May 2000, pp. 1854-1858.
T.E. Kolding, F. Frederiksen, A. Pokhariyal, "Low-Bandwidth Channel Quality Indication for OFDMA Frequency Domain Packet Scheduling," IEEE Trans. Wireless Communication Systems, Sep. 2006, pp. 282-286.
Y. Ofuji, A. Morimoto, H. Atarashi, M. Sawahashi, "Sector throughput using frequency-and-time domain channel-dependent packet scheduling with channel prediction in OFDMA downlink packet radio access," IEEE Trans. Vehicular Technology Conference, vol. 3, Sep. 2005, pp. 1589-1593.

(Continued)

*Primary Examiner*—Albert T Chou
(74) *Attorney, Agent, or Firm*—Austin Rapp & Hardman

(57) ABSTRACT

A method for assigning physical resource blocks (PRBs) is described. A first PRB is assigned to a first device from a plurality of devices. The first device maximizes a proportional fair algorithm on the first PRB. A second PRB is assigned to a second device from the plurality of devices. The second device maximizes a proportional fair algorithm on the second PRB. A determination is made whether a higher throughput would occur if the first PRB is assigned to the second device and the second PRB is assigned to the first device. The assignment of the first PRB is exchanged with the assignment of the second PRB if a higher throughput would occur.

22 Claims, 7 Drawing Sheets

OTHER PUBLICATIONS

A. Pokhariyal, T.E. Kolding, P.E. Mogensen, "Performance of Downlink Frequency Domain Packet Scheduling for the UTRAN Long Term Evolution," IEEE Trans. Personal, Indoor and Mobile Radio Communications, Sep. 2006, pp. 1-5.

A. Pokhariyal, K.I. Pedersen, G. Monghal, I.Z. Kovacs, C. Rosa, T.E. Kolding, P.E. Morgensen, "HARQ Aware Frequency Domain Packet Scheduler with Different Degrees of Fairness for the UTRAN Long Term Evolution," IEEE Trans. Vehicular Technology Conference, Apr. 2007, pp. 2761-2765.

A. Pokhariyal, B. Monghal, K.I. Pedersen, P.E. Mogensen, I.Z. Kovacs, C. Rosa, T.E. Kolding, "Frequency Domain Packet Scheduling Under Fractional Load for the UTRAN LTE Downlink," IEEE Trans. Vehicular Technology Conference, Apr. 2007, pp. 699-703.

D. Tse, "Multiuser Diversity in Wireless Networks," www.eecs.berkeley.edu/~dtse/stanford416.ps, 2002.

N. Wei, A. Pokhariyal, T.B. Sorensen, T.E. Kolding, P.E. Mogensen, "Performance of MIMO with Frequency Domain Packet Scheduling in UTRAN LTE Downlink," IEEE Trans. Vehicular Technology Conference, Apr. 2007, pp. 1177-1181.

C. Wengerter, J. Ohlhorst, A.G.E. von Elbwart, "Fairness and throughput analysis for generalized proportional fair frequency scheduling in OFDMA," IEEE Trans. Vehicular Technology Conference, vol. 3, May 2005, pp. 1903-1907.

\* cited by examiner

SYSTEMS AND METHODS FOR ASSIGNING PHYSICAL RESOURCE BLOCKS

TECHNICAL FIELD

The present disclosure relates generally to communications and wireless communications related technology. More specifically, the present disclosure relates to systems and methods for assigning physical resource blocks.

BACKGROUND

A wireless communication system typically includes a base station in wireless communication with a plurality of user devices (which may also be referred to as user equipment (UE), mobile stations, subscriber units, access terminals, etc.). The base station transmits data to the user devices over a radio frequency (RF) communication channel. The term "downlink" refers to transmission from a base station to a user device, while the term "uplink" refers to transmission from a user device to a base station.

Orthogonal frequency division multiplexing (OFDM) is a modulation and multiple-access technique whereby the transmission band of a communication channel is divided into a number of equally spaced sub-bands. A sub-carrier carrying a portion of the user information is transmitted in each sub-band, and every sub-carrier is orthogonal with every other sub-carrier. Sub-carriers are sometimes referred to as "tones." OFDM enables the creation of a very flexible system architecture that can be used efficiently for a wide range of services, including voice and data. OFDM is sometimes referred to as discrete multi-tone transmission (DMT).

The $3^{rd}$ Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union. The 3GPP Long Term Evolution ("LTE") Committee is considering OFDM as well as OFDM/OQAM (Orthogonal Frequency Division Multiplexing/Offset Quadrature Amplitude Modulation), as a method for downlink transmission, as well as OFDM transmission on the uplink.

Wireless communications systems (e.g., Time Division Multiple Access (TDMA), Orthogonal Frequency-Division Multiplexing (OFDM)) usually implement scheduling techniques to assign physical resource blocks (PRBs) to user devices. However, a PRB may be assigned to a user device that does not require the resources provided by the PRB. As such, benefits may be realized by improved systems and methods for exchanging the assignments of physical resource blocks.

DETAILED DESCRIPTION

Figure 1:
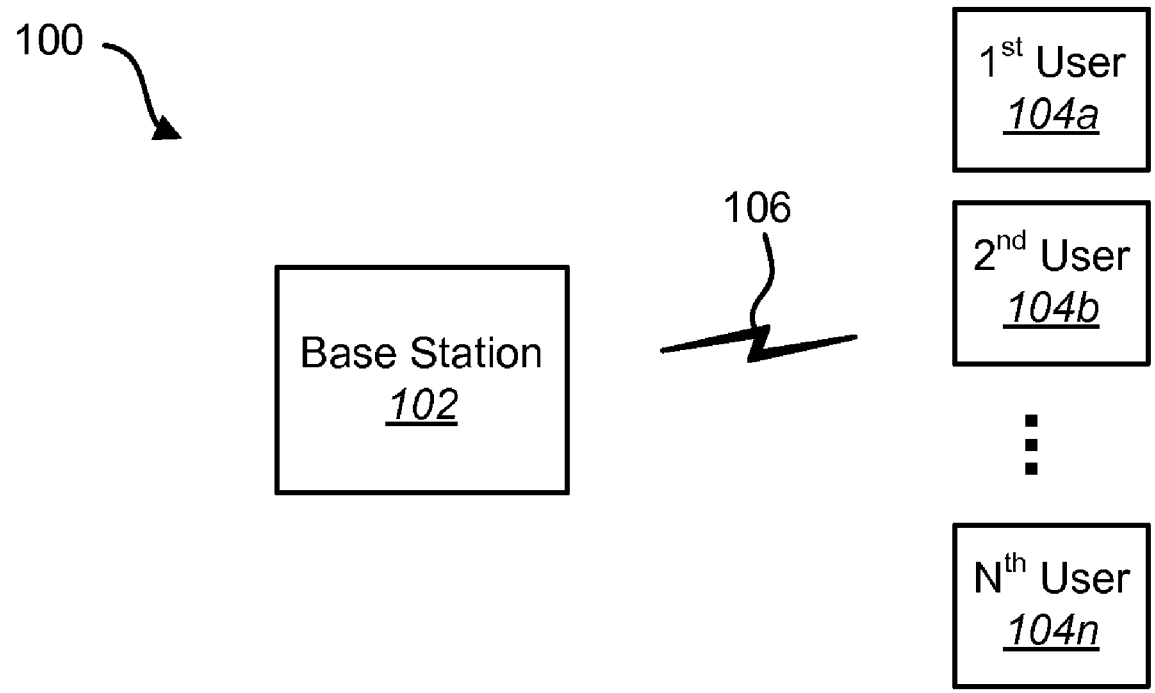
FIG. 1 illustrates an exemplary wireless communication system in which embodiments may be practiced.

A method for assigning physical resource blocks (PRBs) is described. A first PRB is assigned to a first device from a plurality of devices. The first device maximizes a proportional fair algorithm on the first PRB. A second PRB is assigned to a second device from the plurality of devices. The second device maximizes a proportional fair algorithm on the second PRB. A determination is made whether a higher throughput would occur if the first PRB is assigned to the second device and the second PRB is assigned to the first device. The assignment of the first PRB is exchanged with the assignment of the second PRB if a higher throughput would occur.

In one embodiment, a base station assigns the physical resource blocks to communication devices. A determination may be made whether M PRBs are assigned to N devices. Iterations may be performed until M PRBs are assigned to N devices.

A PRB may be assigned to a certain device according to the queue size of said certain device. The initial assignments of the PRBs may be maintained if a higher throughput would not occur by exchanging the assignments of the PRBs.

In one embodiment, the exchange of PRB assignments is implemented in downlink scheduling in Orthogonal Frequency Divisional Multiple Access (OFDM) communication systems. In a further embodiment, the exchange of PRB assignments is implemented in uplink scheduling in OFDM communication systems. The proportional fair algorithm may be expressed as $$\hat{i} = \arg\max_{i} \frac{\min\{r_{i,c}(t), Q_i^c(t)\}}{R_i(t)}.$$

A base station that is configured to assign physical resource blocks (PRBs) is also described. The base station includes a processor and memory in electronic communication with the processor. Instructions are stored in the memory. A first PRB is assigned to a first device from a plurality of devices. The first device maximizes a proportional fair algorithm on the first PRB. A second PRB is assigned to a second device from the plurality of devices. The second device maximizes a proportional fair algorithm on the second PRB. A determination is made whether a higher throughput would occur if the first PRB is assigned to the second device and the second PRB is assigned to the first device. The assignment of the first PRB is exchanged with the assignment of the second PRB if a higher throughput would occur.

A computer-readable medium comprising executable instructions is also described. A first PRB is assigned to a first device from a plurality of devices. The first device maximizes a proportional fair algorithm on the first PRB. A second PRB is assigned to a second device from the plurality of devices. The second device maximizes a proportional fair algorithm on the second PRB. A determination is made whether a higher throughput would occur if the first PRB is assigned to the second device and the second PRB is assigned to the first device. The assignment of the first PRB is exchanged with the assignment of the second PRB if a higher throughput would occur.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Orthogonal Frequency Division Multiple Access (OFDM) has been considered to be the broadband air interface because of its robustness to multi-path fading and higher spectral efficiency. The $3^{rd}$ Generation Partnership Project (3GPP) has implemented OFDM for long-term evolution (LTE) downlink radio access technology. Multiple access may be achieved by assigning different portions of the system bandwidth to individual users based on their feedback information about channel conditions. Such simultaneous frequency-domain multiplexing of users (inherently in concert with time-domain scheduling) may be performed by frequency domain packet scheduling (FDPS). The FDPS may show 40-60% gains of average system capacity improvement over time-domain only scheduling.

In order to achieve large FDPS gain from multi-user frequency diversity, a scheduler is aware of the instantaneous radio channel conditions across all users and all sub-bands, which are fed as input for the frequency-domain adaptive user-to-sub-band allocation. In LTE, each user equipment (UE) may report its instantaneous channel measurement, denoted as channel quality indicator (CQI), to the scheduler. In one embodiment, the scheduler is a base station, such as an Evolved NodeB (eNB).

FIG. 1 illustrates an exemplary wireless communication system 100 in which embodiments of the present systems and methods may be practiced. A base station 102 (also referred to as an eNB) is in wireless communication with a plurality of user devices 104 (which may also be referred to as UEs, mobile stations, subscriber units, access terminals, etc.). A first user device 104a, a second user device 104b, and an Nth user device 104n are shown in FIG. 1. The base station 102 transmits data to the user devices 104 over a radio frequency (RF) communication channel 106. The user devices 104 transmit channel measurement information to the base station 102, such as a CQI report.

As used herein, the term "OFDM transmitter" refers to any component or device that transmits OFDM signals. An OFDM transmitter may be implemented in a base station 102 that transmits OFDM signals to one or more user devices 104. Alternatively, an OFDM transmitter may be implemented in a user device 104 that transmits OFDM signals to one or more base stations 102.

The term "OFDM receiver" refers to any component or device that receives OFDM signals. An OFDM receiver may be implemented in a user device 104 that receives OFDM signals from one or more base stations 102. Alternatively, an OFDM receiver may be implemented in a base station 102 that receives OFDM signals from one or more user devices 104.

Figure 2:
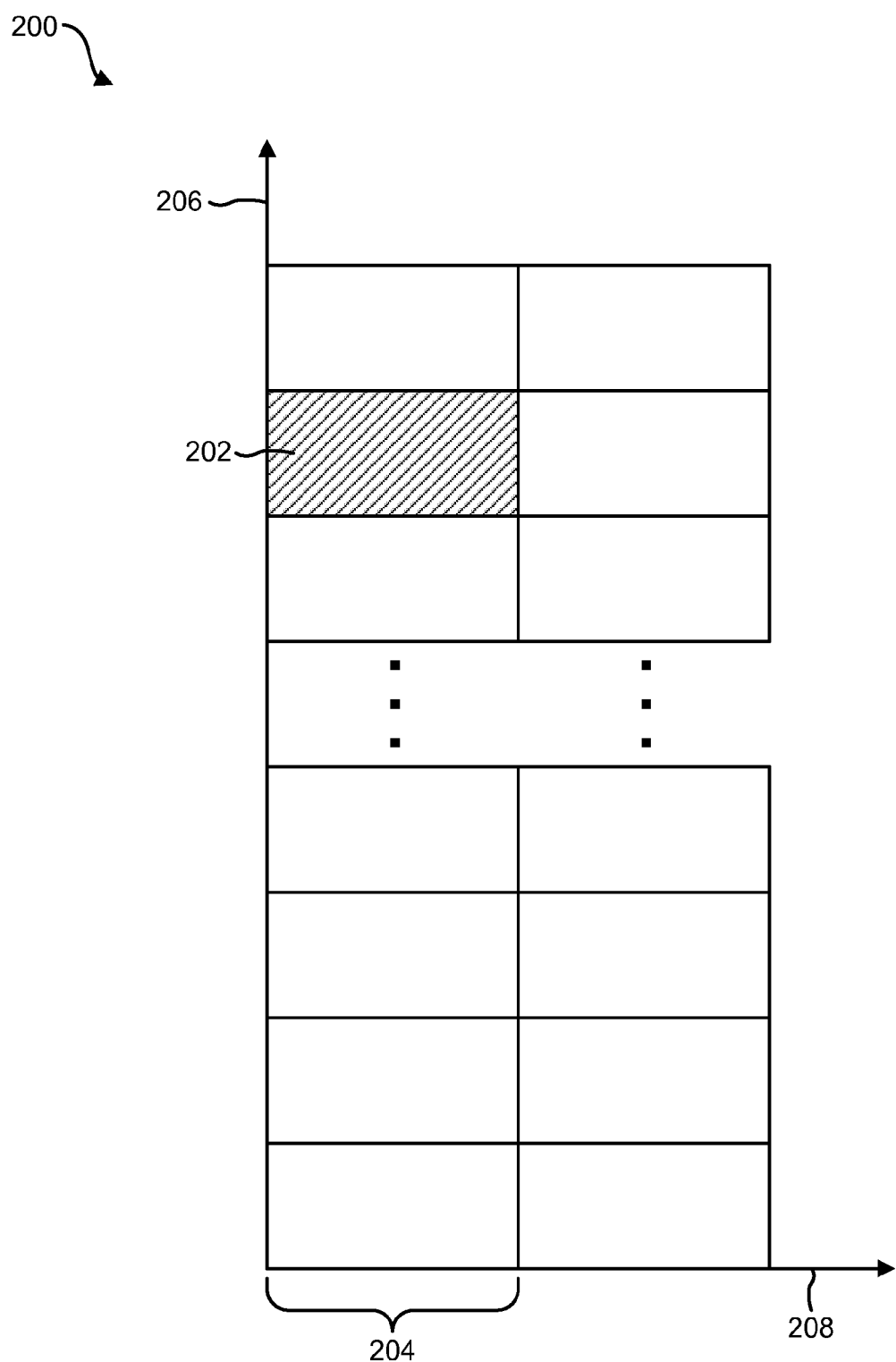
FIG. 2 is one embodiment of a system resource divided into multiple subbands.

FIG. 2 is one embodiment of a system resource 200 divided into multiple subbands. The system resource 200 is illustrated along a time domain 208 and a frequency domain 206. The multiple subbands may be referred to as groups of subcarriers denoted as physical resource blocks (PRBs) 202. The time domain 208 may be divided into subframes 204 with several OFDM symbols.

The scheduler (i.e. base station, eNB, etc.) may use CQI reports transmitted from user devices (i.e. UE) to perform PRB-to-UE assignment every subframe 204 according to the implemented scheduling policy. In the time-domain, a PRB 202 may be a minimum scheduling resolution. In addition, the PRB 202 may be a minimum unit of the data rate adaptation by adaptive modulation and coding (AMC) with a granularity of one subframe.

Figure 3:
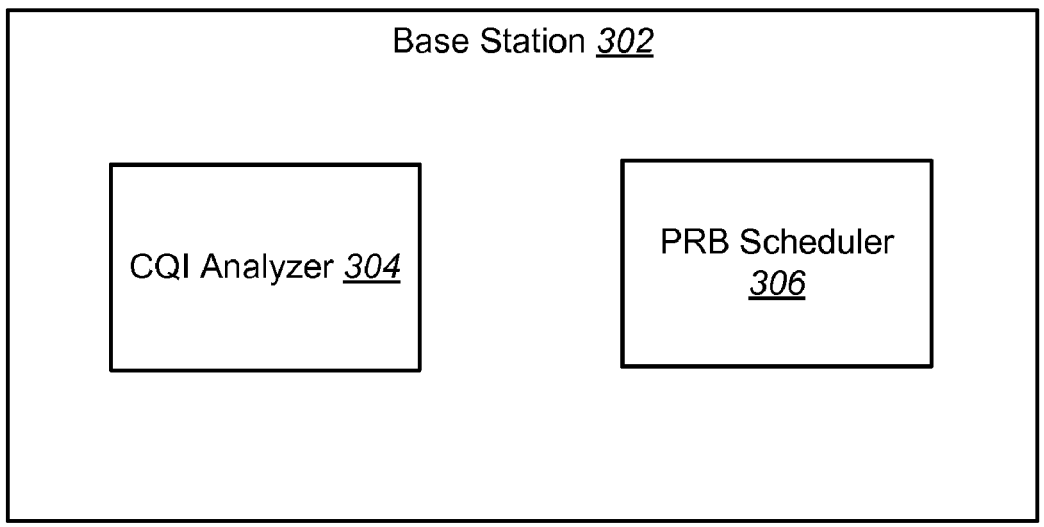
FIG. 3 is one embodiment of a scheduler that assigns physical resource blocks (PRBs) to user equipment (UE)

FIG. 3 is one embodiment of a scheduler that assigns PRBs to UEs. The scheduler may be a base station 302. The base station 302 may include a CQI analyzer 304 that receives and analyzes CQI reports received from various UEs. In addition, the base station 302 may include a PRB scheduler 306 that assigns a PRB to a particular UE.

Current FDPS techniques implement a first proportional fair (PF) algorithm as a basic scheduling principle for both the time and frequency domains. The first PF algorithm provides improvement on average cell capacity as well as coverage gain without algorithmic complexity. However, implementing the first PF algorithm does not provide an optimal result. For example, the first PF algorithm may assign a first UE a PRB when the first UE is not in need of these resources. This may be referred to as a greedy assignment. Such a greedy assignment of each PRB to the user selected by the implementation of the first PF algorithm may result in performance degradation in both throughput and fairness, particularly when some of the queues of the UEs are relatively small.

Existing FDPS techniques schedule PRBs to UEs one by one in isolation by applying the first PF algorithm for each PRB in turn. At time t, for a certain PRB c, FDPS selects a user î who maximizes the first PF algorithm:

$$\hat{i} = \arg\max_i \frac{r_{i,c}(t)}{R_i(t)} \qquad \text{Equation (1)}$$

where $r_{i,c}(t)$ is the instantaneous channel rate for user i on PRB c (e.g. estimated from CQI transmitted from user i), and $R_i(t)$ is the average service rate provided to user i in the past. However, implementing the first PF algorithm (shown as Equation (1)) has the potential shortcomings of assigning more service to a user than it can actually use when the queues are relatively small (i.e. the amount of data in the queue of user î is less than the channel rate $r_{i,c}(t)$). The first PF algorithm may be revised to a second PF algorithm that takes the small queue into account. The second PF algorithm may be as follows:

$$\hat{i} = \arg\max_i \frac{\min\{r_{i,c}(t), Q_i^c(t)\}}{R_i(t)} \qquad \text{Equation (2)}$$

where $Q_i^c(t)$ is the queue size of user i when the scheduling procedure is on PRB c. The queue size may also be represented as:

$$Q_i^{c+1}(t) = \begin{cases} \max\{0, Q_i^c(t) - r_{i,c}(t)\} & \text{if } i = \hat{i} \\ Q_i^c(t) & \text{otherwise.} \end{cases} \qquad \text{Equation (3)}$$

Although the second PF algorithm may be more responsive to UEs with small queues than the first PF algorithm, the second PF algorithm may still suffer from the greedy PRB assignment strategy. The following table provides two users (user A and user B) and two PRBs (a first PRB and a second PRB) and their respective channel rates.

TABLE 1

| User | PRB | |
|---|---|---|
| | 1 | 2 |
| User A | 80 | 90 |
| User B | 70 | 50 |

The queue size may be the same for the two users, $Q_A(t) = Q_B(t) = 100$. User B may have received more service than user A in the past so that $R_B(t) = 2*R_A(t)$. If the first PF algorithm is implemented, FDPS will assign the first PRB and the second PRB to user A, with the actual throughput of 100 ($\phi_{A,1} + \phi_{A,2} = 80+20=100$). However, if the second PF algorithm is implemented, FDPS will assign the second PRB to user B (since the queue size of user A ($Q_A(t)=20$) is counted instead of the channel rate ($r_{A,2}(t)=90$), which results in better throughput of 130 ($\phi_{A,1}+\phi_{B,2}=80+50=130$). Further, fairness may also be improved by implementing the second PF algorithm. The fairness may be measured by:

$$F_\phi(\Delta t) = \frac{\left[\sum_{i=1}^{N} \phi_i(\Delta t)\right]^2}{\left[N \cdot \sum_{i=1}^{N} \phi_i(\Delta t)^2\right]} \qquad \text{Equation (4)}$$

where $\phi_i(\Delta t)$ denotes the actual data-rate user i achieved in time interval $\Delta t$, with N users in the system. The results of the above example are provided in the following table:

TABLE 2

| PF Algorithm | Throughput | Throughput | Total Throughput | Fairness |
|---|---|---|---|---|
| First PF Algorithm | 80 (A) | 20 (A) | 100 | 0.5 |
| Second PF Algorithm | 80 (A) | 50 (B) | 130 | 0.95 |

However, a more advantageous assignment would be the reverse assignment of the second PF algorithm FDPS (i.e. the first PRB assigned to user B and the second PRB assigned to user A) in terms of the actual throughput ($\phi_{B,1}+\phi_{A,2}=70+90=160$) as well as the fairness perspective. As previously explained, the less-efficient PRB assignment by the second PF algorithm comes from the greedy scheduling strategy in which a single PRB is considered in isolation one-by-one regardless of the status of other PRB assignments. In one embodiment, PF FDPS of the present systems and methods additionally consider other parameters (e.g. the status of other PRB assignments, users' queue size, the resulting system throughput, etc.) A swap-algorithm may be implemented, which is an efficient and less complex PF FDPS algorithm when small-queues exist.

Figure 4:
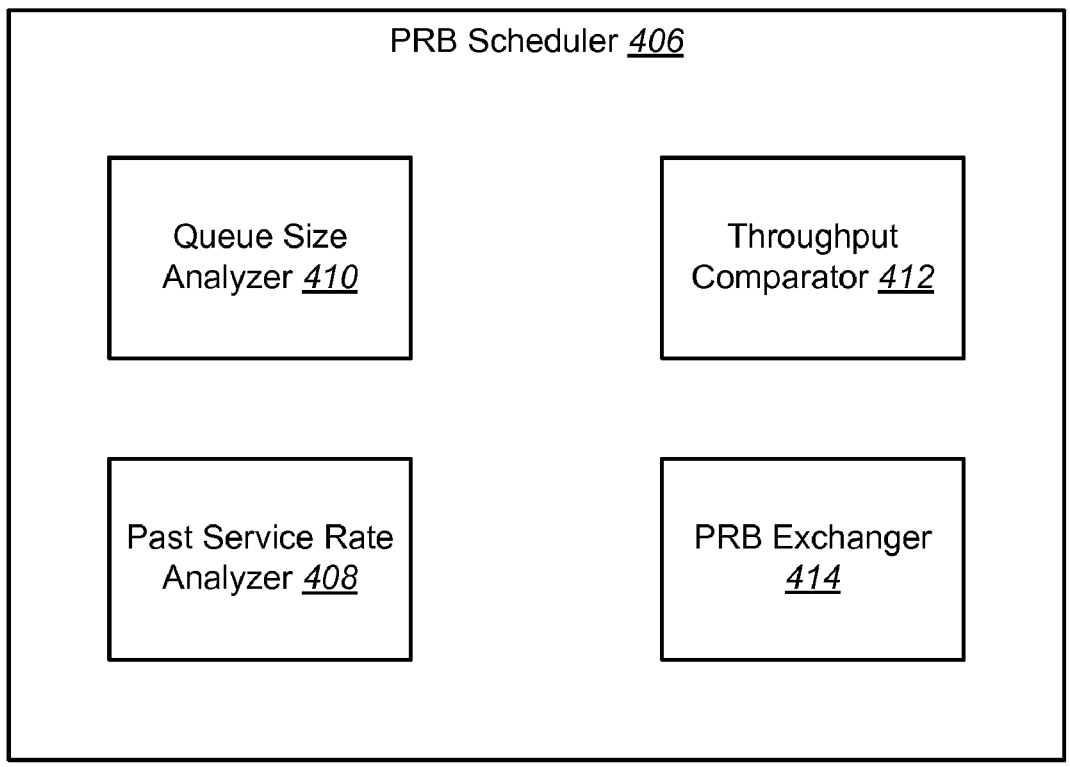
FIG. 4 is one embodiment of a PRB scheduler.

FIG. 4 is a further embodiment of the PRB scheduler 406. The PRB scheduler 406 may include a queue size analyzer 410 that analyzes the size of the queue for a UE. The queue size analyzer 410 may determine whether the size of the queue should be used (instead of the channel rate) when assigning a PRB to a UE. The PRB scheduler 406 may also include a past service rate analyzer 408 which determines the past service rate a particular UE experienced in the past. A throughput comparator 412 may compare the total throughput achieved from the implementation of the second PF algorithm. A PRB exchanger 414 may swap PRB assignments amongst UEs depending on the comparison executed by the throughput comparator 412.

Figure 5:
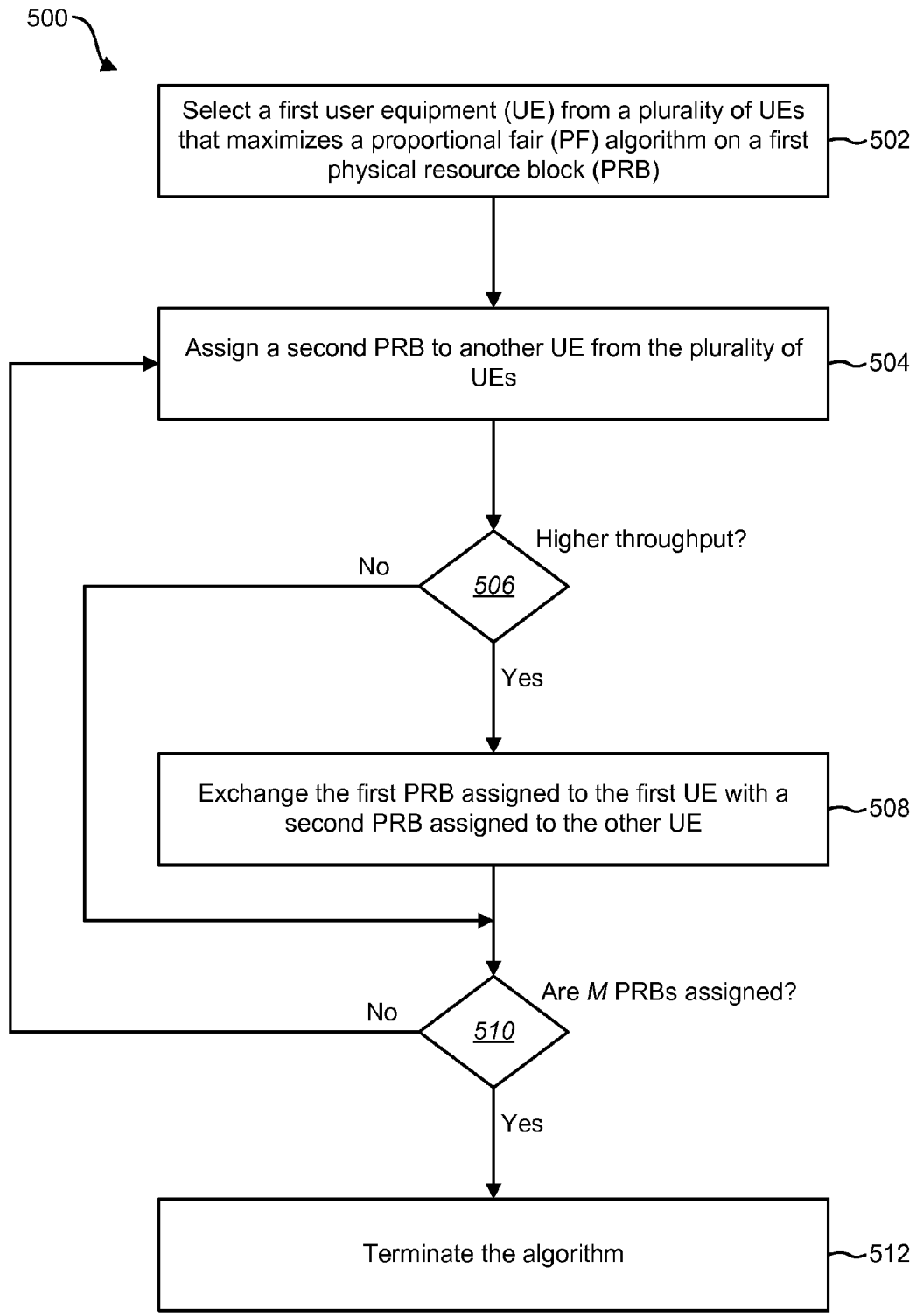
FIG. 5 is a flow diagram illustrating one embodiment of a method for exchanging PRB assignments amongst UEs to improve throughput and fairness.

FIG. 5 is a flow diagram illustrating one embodiment of a method 500 for exchanging PRB assignments amongst UEs to improve throughput and fairness. The method 500 may be referred to as the swap-algorithm. Based on the second PF algorithm, the swap-algorithm may be a single-pass procedure that iterates through all M PRBs one-by-one, starting from $PRB_1$ and terminating at $PRB_M$. In one embodiment, a first UE is selected 502 from a plurality of UEs. The selected first UE may be the UE that maximizes the second PF algorithm on a first PRB. The method 500 may assign 504 a second PRB to another UE from the plurality of UEs. In one embodiment, the other UE maximizes the second PF algorithm on the second PRB. A determination 506 is made whether a higher throughput would be achieved by relinquishing the assignment of the first PRB from the first UE and assigning the first PRB to the other UE and assigning the second PRB to the first UE. As previously explained, the second PRB is initially assigned to the other UE.

If it is determined 506 that a high throughput would be achieved, the first PRB assigned to the first UE is exchanged (or swapped) 508 with the second PRB assigned to the other UE. However, if it is determined 506 that a high throughput would not be achieved, the assignment of the first PRB and the second PRB are not exchanged. A determination 510 is made whether all M PRBs have been assigned. If so, the swap-algorithm may be terminated 512. If not, the method 500 may be iterated until all M PRBs have been assigned.

In a small-queue condition, where some of the queues of the UEs are relatively small, the swap-algorithm allocates PRBs more advantageously to achieve better system throughput by considering other PRB assignment status while keeping PF property within each single PRB assignment. Since the swap-algorithm iterates through all PRBs in index order, some PRBs with lower indices may be assigned in a greedy manner (isolated local optimum), but it may be readjusted by implementing a swap (or exchange) process when assigning subsequent PRBs.

Figure 6:
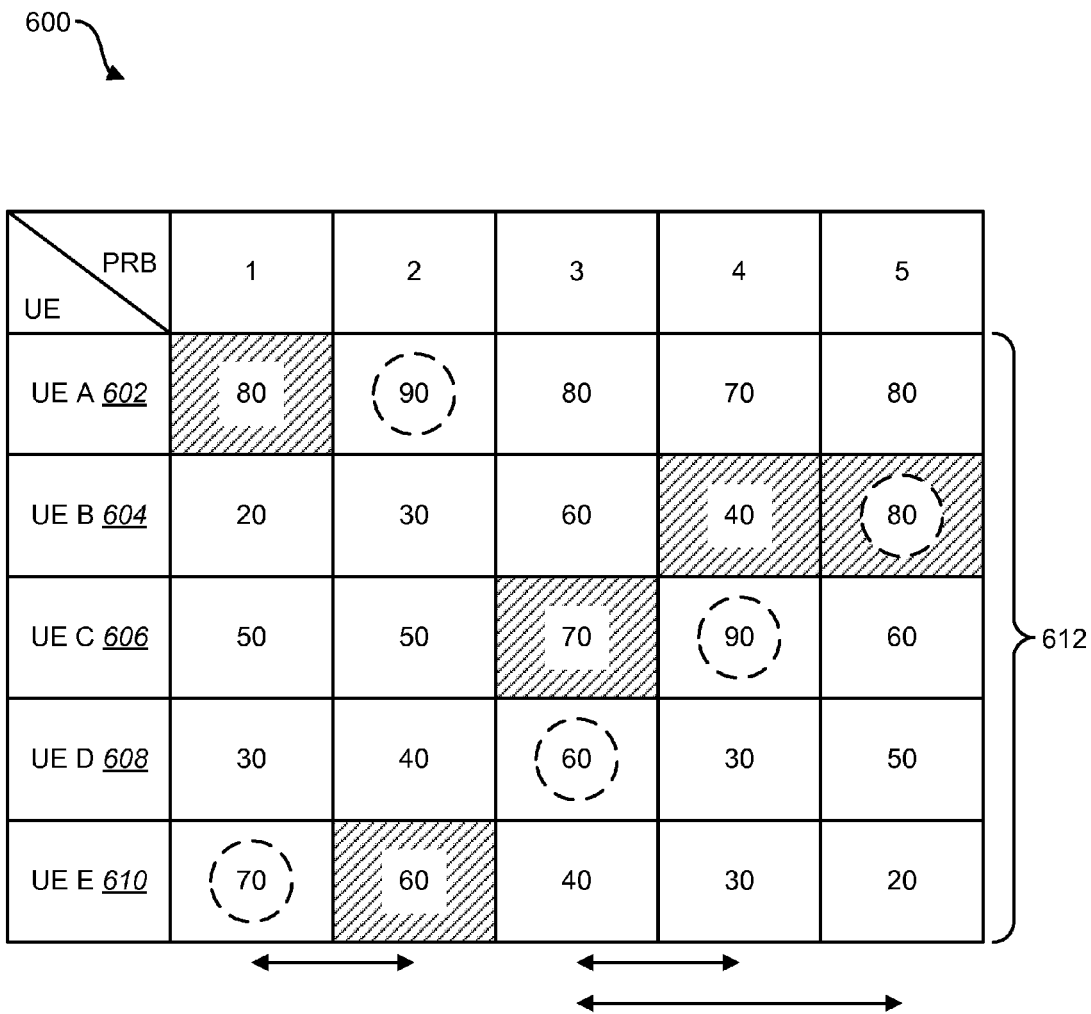
FIG. 6 is one embodiment of implementing a swap-algorithm to assign PRBs to UEs.

FIG. 6 is one embodiment 600 of implementing the swap-algorithm to assign PRBs to UEs. There may be five UEs (UE A 602, UE B 604, UE C 606, UE D 608 and UE E 610). UE A 602, UE B 604 and UE C 606 may have the same amount of data in their queues ($Q_A=Q_B=Q_C=100$). The queue of UE D 608 and UE E 608 may be substantially larger than the queue size of UE A 602, UE B 604 and UE C 606. In one embodiment, all UEs had the same service rate provided in the past ($R_{A-D}=R_E$). Also illustrated are the various channel rates 612 for each UE.

The FDPS may start the PF scheduling on $PRB_1$, on which UE A 602 is selected ($\phi_{A,1}=80$). On $PRB_2$, UE E 610 is initially considered as the best UE ($\beta_{E,2}=60$), since a small queue for UE A 602 ($Q_A^2=20$) is counted instead of the channel rate ($r_{A,2}=90$). However, UE A 602 would be the best user maximizing the second PF algorithm on $PRB_2$, without the earlier assignment of $PRB_1$ to UE A 602. In one embodiment, the swap-algorithm checks whether a globally more advantageous allocation can be made by reassigning $PRB_1$, to UE E 610 and assigning $PRB_2$, to UE A 602. In this case, such PRB-assignment results in better throughput ($r_{E,1}+r_{A,2}=70+90=160$) than the locally-optimal one ($\Phi_{A,1}+\beta_{E,2}=80+60=140$), so the swapping of $PRB_1$ and $PRB2$ is executed between UE A 602 and UE E 610.

Then, on $PRB_3$, UE C 606 may be chosen and no swap is triggered, since swapping offers a performance degradation in this case ($\Phi_{A,2}+\beta_{C,3}=90+70=160 > r_{C,2}+r_{A,3}=50+80=130$). On $PRB_4$, UE B 604 may first be viewed as the best user, but there exists two potential candidate UEs (UE A 602 and UE C 606) since ($Q_A^4=10$, $Q_C^4=30$). In such a case, the one that would result in the best throughput (if a swap executed) is considered. UE C 606 may provide better throughput than UE A 602 ($r_{B,3}+r_{C,4}=60+90=150 > r_{B,2}+r_{A,4}=30+70=100$). Then, the swap between UE B 604 ($PRB_4$) and UE C 606 ($PRB_3$) is performed, which contributes to the system throughput improvement ($r_{B,3}+r_{C,4}=60+90=150 > \Phi_{C,3}+\beta_{B,4}=70+40=110$).

Further, on $PRB_5$, UE D 608 may first be considered as the best user ($\beta_{D,5}=50$), with small queues for UE A 602 ($Q_A^5=10$), UE B 604 ($Q_B^5=40$), and UE C 606 ($Q_C^5=10$). Among those potential candidates, swapping with UE B 604 may offer the highest throughput ($r_{D,3}+r_{B,5}=60+70=130$) and it is also better than locally-optimal throughput ($\Phi_{B,3}+\Gamma_{D,5}=60+50=110$). In one embodiment, swapping between UE D 608 ($PRB_5$) and UE B 604 ($PRB_3$) is triggered, and then the algorithm terminates.

As a result, the swap-algorithm in this example achieves the resulting system throughput of 380, which is 22% higher than implementing the second PF algorithm which provides a throughput of 310. Fairness amongst the various UEs is also improved in this example.

In the above described embodiment, throughput may be used as a performance metric to decide whether to exchange the assignment of PRBs between UEs. However, the present systems and methods also apply to other performance metrics being used for that purpose, for example, fairness, etc. In that case, the method 500 may also determine whether a better fairness between UEs would be achieved by relinquishing the assignment of the first PRB from the first UE and assigning the first PRB to the other UE and assigning the second PRB to the first UE.

The swap-algorithm may be implemented in downlink scheduling in OFDMA communication systems. However, this algorithm may also apply for uplink scheduling as far as the queue status information is available in the scheduler, for example in 3GPP LTE systems. Such OFDM-based communication systems include 802.11a, 802.11g, 802.16, PLC as well as the 3GPP LTE systems.

Figure 7:
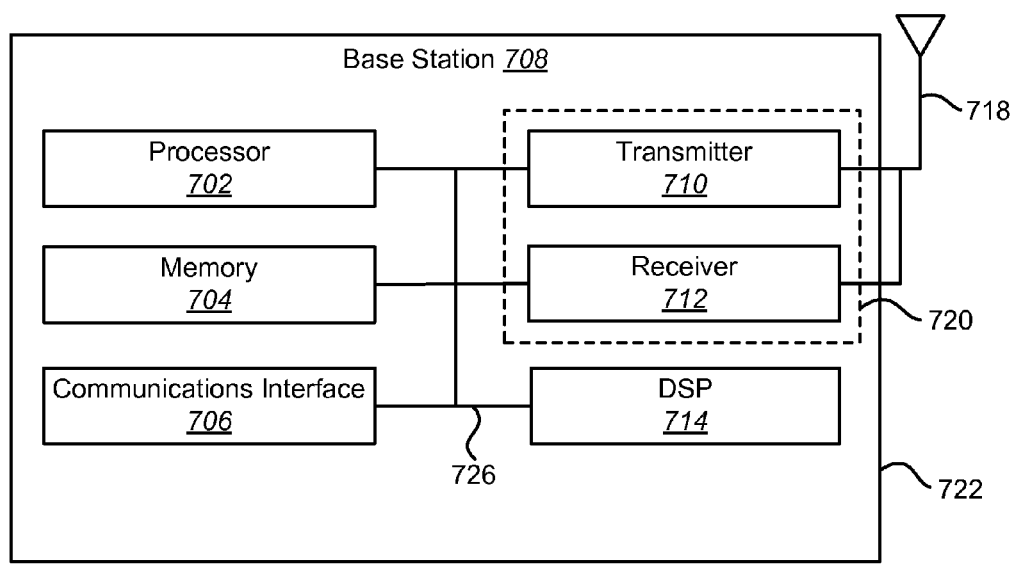
FIG. 7 illustrates various components that may be utilized in a base station.

FIG. 7 is a block diagram of a base station 708 in accordance with one embodiment of the disclosed systems and methods. The base station 708 may be an eNB, a base station controller, a base station transceiver, etc. The base station 708 includes a transceiver 720 that includes a transmitter 710 and a receiver 712. The transceiver 720 may be coupled to an antenna 718. The base station 708 further includes a digital signal processor (DSP) 714, a general purpose processor 702, memory 704, and a communication interface 706. The various components of the base station 708 may be included within a housing 722.

The processor 702 may control operation of the base station 708. The processor 702 may also be referred to as a CPU. The memory 704, which may include both read-only memory (ROM) and random access memory (RAM), provides instructions and data to the processor 702. A portion of the memory 704 may also include non-volatile random access memory (NVRAM). The memory 704 may include any electronic component capable of storing electronic information, and may be embodied as ROM, RAM, magnetic disk storage media, optical storage media, flash memory, on-board memory included with the processor 702, EPROM memory, EEPROM memory, registers, a hard disk, a removable disk, a CD-ROM, etc. The memory 704 may store program instructions and other types of data. The program instructions may be executed by the processor 702 to implement some or all of the methods disclosed herein.

In accordance with the disclosed systems and methods, the antenna 718 may receive reverse link signals that have been transmitted from a nearby communications device, such as a UE. The antenna 718 provides these received signals to the transceiver 720 which filters and amplifies the signals. The signals are provided from the transceiver 720 to the DSP 714 and to the general purpose processor 702 for demodulation, decoding, further filtering, etc.

The various components of the base station 708 are coupled together by a bus system 726 which may include a power bus, a control signal bus, and a status signal bus in addition to a data bus. However, for the sake of clarity, the various busses are illustrated in FIG. 7 as the bus system 726.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. A method for assigning physical resource blocks (PRBs), comprising:
    assigning a first PRB to a first device from a plurality of devices, wherein the first device maximizes a proportional fair algorithm on the first PRB;
    assigning a second PRB to a second device from the plurality of devices, wherein the second device maximizes a proportional fair algorithm on the second PRB;
    determining whether a higher throughput would occur if the first PRB is assigned to the second device and the second PRB is assigned to the first device; and
    if a higher throughput would occur:
        exchanging the assignment of the first PRB with the assignment of the second PRB.

2. The method of claim 1, wherein a base station assigns the physical resource blocks to communication devices.

3. The method of claim 1, further comprising determining whether M PRBs are assigned to N devices.

4. The method of claim 3, further comprising performing iterations until M PRBs are assigned to N devices.

5. The method of claim 1, further comprising assigning a PRB to a certain device according to the queue size of said certain device.

6. The method of claim 1, further comprising maintaining the initial assignments of the PRBs if a higher throughput would not occur by exchanging the assignments of the PRBs.

7. The method of claim 1, further comprising implementing the exchange of PRB assignments in downlink scheduling in Orthogonal Frequency Divisional Multiple Access (OFDM) communication systems.

8. The method of claim 1, further comprising implementing the exchange of PRB assignments in uplink scheduling in OFDM communication systems.

9. The method of claim 1, wherein the proportional fair algorithm is expressed as $$\hat{i} = \arg\max_i \frac{\min\{r_{i,c}(t), Q_i^c(t)\}}{R_i(t)}.$$

10. A base station that is configured to assign physical resource blocks (PRBs), the base station comprising:
    a processor;
    memory in electronic communication with the processor;
    instructions stored in the memory, the instructions being executable to:
        assign a first PRB to a first device from a plurality of devices, wherein the first device maximizes a proportional fair algorithm on the first PRB;
        assign a second PRB to a second device from the plurality of devices, wherein the second device maximizes a proportional fair algorithm on the second PRB;
        determine whether a higher throughput would occur if the first PRB is assigned to the second device and the second PRB is assigned to the first device; and
        if a higher throughput would occur:
            exchange the assignment of the first PRB with the assignment of the second PRB.

11. The base station of claim 10, wherein the base station is an Evolved NodeB base station.

12. The base station of claim 10, wherein the instructions are further executable to determine whether M PRBs are assigned to N devices.

13. The base station of claim 12, wherein the instructions are further executable to perform iterations until M PRBs are assigned to N devices.

14. The base station of claim 10, wherein the instructions are further executable to assign a PRB to a certain device according to the queue size of said certain device.

15. The base station of claim 10, wherein the instructions are further executable to maintain the initial assignments of the PRBs if a higher throughput would not occur by exchanging the assignments of the PRBs.

16. The base station of claim 10, wherein the instructions are further executable to implement the exchange of PRB assignments in downlink scheduling in Orthogonal Frequency Divisional Multiple Access (OFDM) communication systems.

17. The base station of claim 10, wherein the instructions are further executable to implement the exchange of PRB assignments in uplink scheduling in OFDM communication systems.

18. The base station of claim 10, wherein the proportional fair algorithm is expressed as $$\hat{i} = \arg\max_i \frac{\min\{r_{i,c}(t), Q_i^c(t)\}}{R_i(t)}.$$

19. A computer-readable non-transitory medium comprising executable instructions for:
    assigning a first PRB to a first device from a plurality of devices, wherein the first device maximizes a proportional fair algorithm on the first PRB;
    assigning a second PRB to a second device from the plurality of devices, wherein the second device maximizes a proportional fair algorithm on the second PRB;
    determining whether a higher throughput would occur if the first PRB is assigned to the second device and the second PRB is assigned to the first device; and
    if a higher throughput would occur: exchanging the assignment of the first PRB with the assignment of the second PRB.

20. The computer-readable non-transitory medium of claim 19, wherein a base station assigns the physical resource blocks to communication devices.

21. The computer-readable non-transitory medium of claim 19, wherein the instructions are further executable to determine whether M PRBs are assigned to N devices.

22. The computer-readable non-transitory medium of claim 21, wherein the instructions are further executable to perform iterations until M PRBs are assigned to N devices.

* * * * *

UNITED STATES PATENT AND TRADEMARK OFFICE
CERTIFICATE OF CORRECTION

| | | |
|---|---|---|
| PATENT NO. | : 7,869,403 B2 | Page 1 of 1 |
| APPLICATION NO. | : 11/858043 | |
| DATED | : January 11, 2011 | |
| INVENTOR(S) | : Suk-Bok Lee et al. | |

It is certified that error appears in the above-identified patent and that said Letters Patent is hereby corrected as shown below:

In column 7, lines 41-42 please delete the equation "$(\Phi_{B,3} + \Gamma_{D,5} = 60 + 50 = 110)$" and replace it with the equation --$(\Phi_{B,3} + \beta_{D,5} = 60 + 50 = 110)$--.

Signed and Sealed this
Fourteenth Day of June, 2011

David J. Kappos
*Director of the United States Patent and Trademark Office*